(No Model.)
H. PIETSCH.
STENCH TRAP.
No. 270,473. Patented Jan. 9, 1883.
Fig: 1.
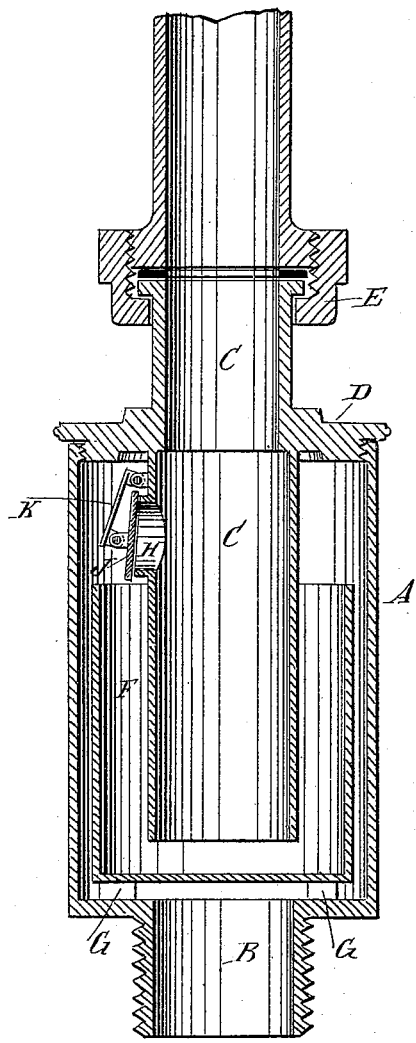
Fig: 2.
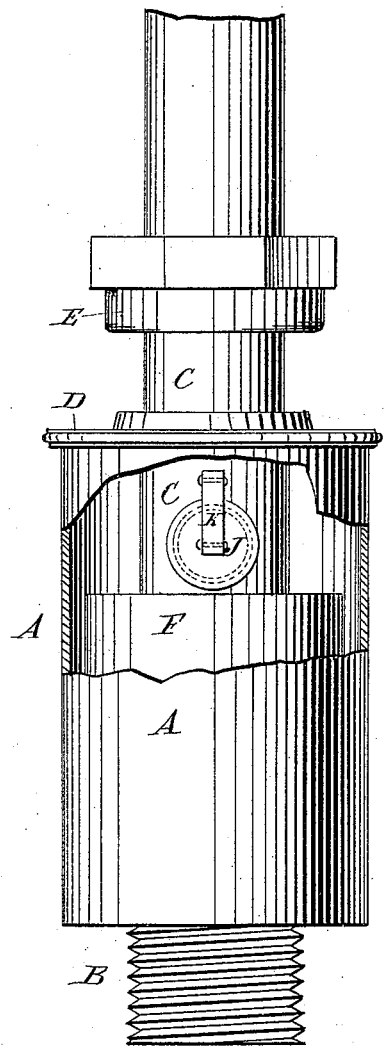
WITNESSES:
Chas. Nida.
C. Sedgwick
INVENTOR:
H. Pietsch
BY Munn &Co
ATTORNEYS.

UNITED STATES PATENT OFFICE.

HERMAN PIETSCH, OF FLATBUSH, NEW YORK.

STENCH-TRAP.

SPECIFICATION forming part of Letters Patent No. 270,473, dated January 9, 1883.

Application filed July 3, 1882. (No model.)

*To all whom it may concern:*

Be it known that I, HERMAN PIETSCH, of Flatbush, in the county of Kings and State of New York, have invented a new and Improved Stench-Trap, of which the following is a full, clear, and exact description.

The object of my invention is to provide a new and improved trap for preventing stench and foul gases from rising in a soil or waste pipe.

The invention consists in a stench-trap formed of two vessels, one contained within the other, into which inner vessel an inlet-pipe projects from the top of the outer vessel, which inlet-pipe is provided with an outwardly-projecting spout or collar, which can be closed by a gate hinged to a strip hinged to the inlet-pipe above this spout or collar, whereby when the suction in the soil-pipe is too great the valve opens and admits air, whereby siphoning out of the water in the inner vessel of the trap is avoided.

Reference is to be had to the accompanying drawings, forming part of this specification, in which similar letters of reference indicate corresponding parts in both the figures.

Figure 1 is a longitudinal sectional elevation of my improved stench-trap. Fig. 2 is a longitudinal elevation of the same, showing parts broken out.

The cylindrical or like vessel A is provided at its bottom with a screw-threaded outlet-collar, B, which is to be screwed into the upper end of the lower section of the soil-pipe. A pipe, C, passing through the cover D, screwed in the vessel, A, has its upper end secured to the lower end of the upper section of the soil-pipe by a loose screw-collar, E, of the usual construction. A cylindrical or cup-shaped vessel, F, which is smaller than the vessel A, and which is open on top, is contained in the vessel A, and is held a short distance from the bottom of the vessel A by blocks or strips G, leaving a space between the sides and bottoms of the vessels A and F. The pipe C projects into the vessel F, near to the bottom of the same, and this pipe C is provided above the vessel F with a short spout or collar, H, which is closed by a gate, J, hinged to a link, K, hinged to a lug projecting from the pipe C above the spout. The gate J closes the opening of the spout or collar automatically by its own weight. The water rises in the vessel F and flows over the upper edge of the same, and through the space between the vessels A and F, and through the outlet of the vessel A. The water in the vessel F forms a seal and prevents the gases from passing into that part of the pipe above the vessel A. As the water in vessel F is frequently siphoned out by the great suction created in the soil-pipe, I have provided the opening H and the gate J, which is opened automatically by the suction and admits air into the vessel A, thereby preventing siphoning out of the water in the vessel F, as the pipe then draws air instead of water.

Having thus fully described my invention, I claim as new and desire to secure by Letters Patent—

1. A stench-trap made substantially as herein shown and described, and consisting of two vessels contained one within the other, and an inlet-pipe passing into the inner vessel, which pipe is provided with an outwardly-opening air-valve, as set forth.

2. In a stench-trap, the combination, with the vessel A, of the vessel F, contained therein, the inlet-pipe C, extending down into the vessel F, the short spout or collar H, and the hinged gate J for closing the same, substantially as herein shown and described, and for the purpose set forth.

3. In a stench-trap, the combination, with the vessel A, of the vessel F, contained therein, the inlet-pipe C, extending down into the vessel F, the short spout or collar H, the gate J, and the strip K, hinged to the gate J, and the pipe C above the collar H, substantially as herein shown and described, and for the purpose set forth.

HERMAN PIETSCH.

Witnesses:
OSCAR F. GUNZ,
CHAS. SEDGWICK.